G. GREIG.

STEAM PLOW.

No. 10,438. Reissued Jan. 22, 1884.

WITNESSES

Robt Everett.

J. A. Rutherford

INVENTOR

George Greig,

By James L. Norris.

Attorney

N. PETERS. Photo-Lithographer, Washington, D. C.

UNITED STATES PATENT OFFICE.

GEORGE GREIG, OF EDINBURGH, SCOTLAND.

STEAM-PLOW.

SPECIFICATION forming part of Reissued Letters Patent No. 10,488, dated January 22, 1884.

Original No. 279,937, dated June 26, 1883. Application for reissue filed August 20, 1883. Patented in England December 21, 1882.

*To all whom it may concern:*

Be it known that I, GEORGE GREIG, of Edinburgh, Scotland, in the Kingdom of Great Britain and Ireland, have invented certain new and useful Improvements Relating to Steam-Plowing, of which the following is a specification.

My improvements pertain to that system of steam-plowing in which the plows are hauled across the field by wire ropes or other ropes or chains by the force of engines stationed at or near the margins, or at various lines serving as subdivisions, if it is a very large field. I have discovered and have reduced to practical form means for overcoming difficulties and increasing the effect by employing two or even three or more plowing-machines attached to the same rope at proper distances apart. The present invention consists in thus combining two or more plowing-machines on one rope or chain, arranging them properly to divide the work between them, and in details of the construction for properly and conveniently operating with such combined machines in plowing fields of triangular or other irregular shapes.

In my plowing-machines, as in others, I can employ a considerable number of plowshares in one machine. It is practicable to carry ten, or possibly more, in one machine, set in proper relations each to its neighbor. The limit is not found in the hauling-power or in the strength of the rope, but in the practical difficulties of managing the long and wide machines which thus become necessary. By my plan of dividing the work between two or more machines, each carrying an attendant, a single set of engines and attendants serve for two or more machines of convenient size, which are collectively of more capacity than one could possibly be, and serve well in all emergencies, and the work is performed faster. The total length of rope required is also reduced by my invention. Another and very important advantage lies in the fact that for furrows of a given length only half as much rope as usual requires to be wound on any windlass.

The following is a description of what I consider the best means for carrying out the invention.

The accompanying drawings form a part of this specification.

Figure 1:
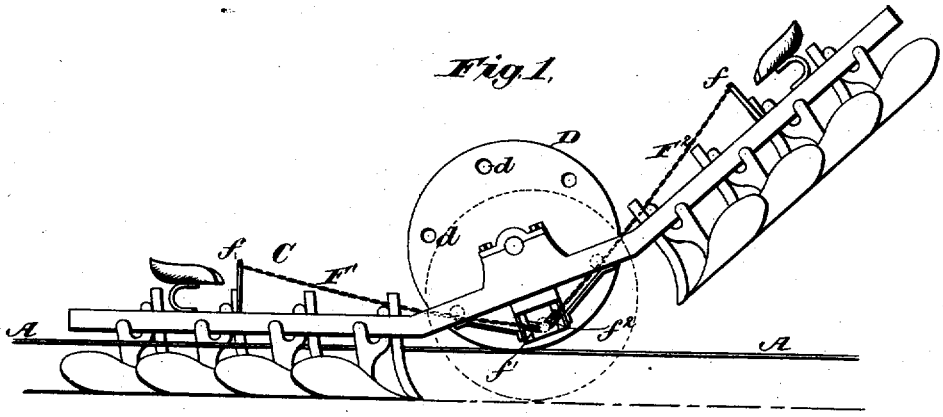
Figure 2:
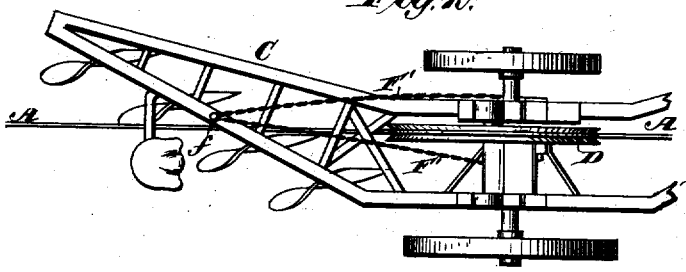
Figure 4:
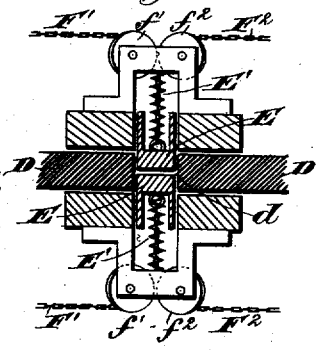
Figure 3:
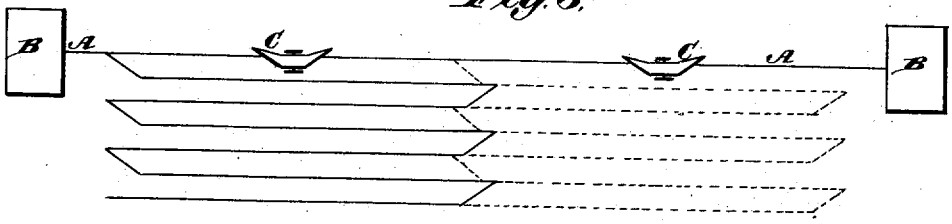

Figure 1 is a side elevation of one machine, certain portions being removed or broken away to better show the construction. Fig. 2 is a plan view of the same. Fig. 3 is an outline on a smaller scale, showing two machines combined, with one operating-rope and set of engines. This figure shows also the paths of the two plowing-machines, the one in strong and the other in faint dotted lines. Fig. 4 is a horizontal section through certain parts, on a larger scale.

Similar letters of reference indicate like parts in all the figures.

A is a length of wire rope sufficient to extend across the widest portion of the field and allow the necessary surplus, which surplus may be less than when only one plowing-machine is employed. I will describe the invention as used with only two plowing-machines drawn by the same rope A. Such will require a rope one and a half times as long as the field is wide.

B B are the anchored engines, secured by the anchorage obtained by their own wheels, or by any other ordinary or suitable means, on the sides or near the sides of the field, and provided with ordinary or suitable means for moving along the respective edges of the field as the several strips are plowed by the traversing of the rope and its attached plowing-machine backward and forward across the field.

C C are two plowing-machines attached to the rope A at a distance apart equal to half the breadth of the field. In commencing to traverse across one is at the edge of the field and the other at the point half-way across. The attendant on each takes the proper steps to move his machine obliquely or directly lateral relatively to the line of the rope, so as to take a proper hold on fresh earth, and, as the rope is wound up by the engine B on the side toward which they are moving, both the plowing-machines C C are effective and plow each six or other proper number of furrows. This proceeds until the foremost plow, which was originally in the center of the field, has reached the edge, and the rearmost plow, which was originally at the edge, has reached the middle. Now the engine stops winding, the attendant on each plow takes the proper course to shift his machine laterally and also to tilt it or otherwise arrange it for plowing in the opposite direction. Then the engine B, which has been winding in the rope, pays it out again by allowing its windlass to unwind freely, and the engine B on the opposite side of the field commences to wind in the rope. Under these conditions both plowing-machines C and C move steadily in the direction opposite to that before traversed, both again plowing six or other number of furrows, and soon the machine which was originally in the middle of the field is again at the center line, ready to be again shifted laterally and start again for its edge. Thus each plowing-machine C plows not all the way, but only half the way, across, the remainder of the distance being plowed by the other machine worked by the same rope A, and caused to move at the same time by the same engine B.

The construction of the plowing-machines C C may be varied. I have shown the general form set forth in a British patent to myself and brother in 1872, No. 3,498. My improvement consists in providing means for rapidly and easily shifting the positions of the machines on the rope, as shown in Figs. 1 and 2. This provision is available to shift the distances of the machines C C apart when the field widens or narrows, so that each shall have half the work. It will be seen that serious difficulties would be involved if the machines were always at a fixed distance apart, or if it required much time and labor to shift their points of attachment to the rope.

Each plowing-machine is provided, in addition to its ordinary adjustments, with a large upright wheel or pulley, D, around which the cable makes a single turn. The wheel is equipped for taking a strong hold of the cable either by a V-shaped groove lined with wood blocks, presenting the end of the grain to the cable, or by the clamps long known in connection with this class of machinery. This wheel need not be of great weight, nor be mounted very strongly at the center, because the strain of the hauling in either direction is received by another device strongly connected to the frame of the plowing-machine, and taking hold of the wheel at the point where the strain of the hauling is received.

The wheel is formed with a series of holes, *d*, all near to the periphery and preferably equidistant apart. I have shown six; but the number may be increased or diminished.

Strong slide bolts or dogs E, adapted to engage in one of these holes *d*, are mounted in strong housings in the framing on each side of the wheel. Each is strongly housed in a portion of the frame-work of the machine, and is subjected to the force of a spring, E′, urging it into engagement with the holes *d*.

To an eye in the outer end of each dog E are attached two cords or chains, $F'$ $F^2$, which pull practically in the same line—that of the extended axis of E. The chain $F'$ is guided by a pulley, $f'$, revolving in bearings supported in the frame-work, and leads to a fastening-point, *f*, near one extremity of the machine within convenient reach of the operator when he sits at that end. The chain $F^2$ is guided by a pulley, $f^2$, and leads to a fastening-point near the opposite end of the machine, within convenient reach of the attendant when he rides on that end and the machine is going in the direction to require his presence there. There is a similar dog and a similar set of chains and guiding-pulleys on the opposite side of the wheel. Both the chains $F'$ are attached to the same point near one end of the machine, and both chains $F^2$ are represented as attached to a point near the opposite end of the machine. This attachment of two chains to the same point is not absolutely essential. It is sufficient that the two chains are placed within convenient access for the operator at the same time. They may, if preferred, be united together, so that the pulling on a single chain or cord, or a lever attached thereto, will work both bolts. So long as the two plowing-machines C and C are at the proper distance apart the wheel D in each machine should be kept firmly locked by its dogs or bolts E; but so soon as it is desired to bring the machines C C nearer together, the operator riding on the foremost machine should allow his wheel D to turn idly and allow the rope A to pass without correspondingly moving his machine. To effect this, he pulls on the chains $F'$ $F'$ or $F^2$ $F^2$, according to which direction the machine is going, and by tension thereon overcomes the force of the springs E′ E′ and draws the dogs E E out of their engagement in the hole *d*, and allows the wheel to turn idly a little, and then by releasing the chains allows the dogs to be pressed inward by their spring E′ E′ and engaged in the next hole, *d*, which is presented thereto. The best time to do this is at the end of a furrow when the rope A and the machines C are changing the direction of their motions. A signal to the attendant in charge of the operating-engines B will cause him to slow, and even to back a little, at any time, to allow this operation to be conveniently effected.

The dogs E, entering from each side, meet at or near the middle of the thickness of the wheel D, and serve to lock the latter very firmly against motion in either direction. The machine retains its position on the rope reliably, and is worked backward and forward by the action of the engine B through the medium of the rope until there is again occasion to change the position, when the operation is repeated. If the machines should be farther apart, the rearmost should be thus dropped back and redogged in a new position farther back. If they should be nearer together, the foremost should drop back. If, by a succession of changes, both machines should be too near one end of the rope, both may be changed simultaneously into a new position on the rope.

My machines may have any ordinary or suitable provisions for raising and lowering the plows, and for adjusting the inclination of the several plows, or adjusting the position of any of the parts.

I have shown each dog E as hollow, with the spring E′ recessed into it, and with a bar extending centrally the length of the recess, with an eye on the outer end, and engaging with the chains F′ F². This arrangement allows a greater length of spring than would be otherwise practicable in the same small compass; but this feature is not essential. I can work the invention successfully without such recessing of the dogs by giving a greater width to the frame.

Modifications may be made. More plowing-machines may be used. If three are used, the spaces between the centers of the machines are each one-third of the entire distance across the field. The same means of shifting the spaces may be employed. One of the machines may be always permanently shackled or otherwise fixed to the rope. The provisions set forth in the said patent of 1872 may be adopted for widening or narrowing the space plowed at each passage of the machine. I can employ more or less than four plowshares in each machine. I can use subsoiling devices. I can omit or vary the means for adjusting the depth of the plowing. I can use a single engine on one side of the field, having a suitable anchored pulley on the other side of the field, and returning the rope therefrom, so that one engine, by the aid of the long or endless rope, can work the two or more plowing-machines in both directions.

I esteem it practicable in good ground to dispense with attendants on one or on both or all of the plowing-machines and to make the shifting action automatic. Such working may succeed where the fields are of even breadth, or where a large tract is divided into a number of sections each of exactly rectangular form. Grubbers may be applied with or instead of plows.

The invention may be used with plowshares of different forms from those here shown. I can substitute the forms of diggers or teeth technically known as "cultivators," or other devices of whatever name adapted to stir, harrow, or otherwise treat the earth on the surface or to any required depth. The invention may be applied on such devices not reversible, but adapted to be turned around at each change of direction of motion of the rope.

I make no general claim to the attachment of two or more cultivating implements to one traction-rope, to work in the manner described in the specification to Hornsby's British patent, dated the 27th December, 1858, No. 2,964, in which arrangement only one of the implements is operating at a time, while the other is merely moving back without operating; but—

I claim as my invention—

1. The combination of two or more plowing-machines, C C, with a single operating rope or chain, A, and impelling means B for the latter, the said plowing-machines being adapted to operate simultaneously, substantially as and for the purpose herein set forth.

2. In steam plowing-machines adapted to operate in pairs or sets, moving one behind another, as specified, the wheel or pulley D, and controlling means adapted to hold and release the rope A, so as to increase or diminish the distance of the machines apart, substantially as and for the purposes herein specified.

In testimony whereof I have signed my name to this specification, in the presence of two subscribing witnesses, this 26th day of July, 1883.

GEORGE GREIG.

Witnesses:
OLIVER IMRAY,
J. WATT.